(12) United States Patent
Lu et al.

(10) Patent No.: US 11,791,476 B2
(45) Date of Patent: Oct. 17, 2023

(54) METHOD OF FABRICATING A MATERIAL FOR USE IN CATALYTIC REACTIONS

(71) Applicant: City University of Hong Kong, Hong Kong (HK)

(72) Inventors: Jian Lu, Hong Kong (HK); Yangyang Li, Hong Kong (HK); Feixiang Ma, Hong Kong (HK)

(73) Assignee: City University of Hong Kong, Hong Kong (HK)

(*) Notice: Subject to any disclaimer, the term of this patent is extended or adjusted under 35 U.S.C. 154(b) by 56 days.

(21) Appl. No.: 17/499,861

(22) Filed: Oct. 13, 2021

(65) Prior Publication Data

US 2022/0131159 A1 Apr. 28, 2022

Related U.S. Application Data

(60) Provisional application No. 63/094,939, filed on Oct. 22, 2020.

(51) Int. Cl.
| | |
|---|---|
| *B01J 21/18* | (2006.01) |
| *B01J 23/40* | (2006.01) |
| *B01J 23/42* | (2006.01) |
| *B01J 23/44* | (2006.01) |
| *B01J 23/46* | (2006.01) |
| *H01M 4/92* | (2006.01) |
| *H01M 8/10* | (2016.01) |
| *H01M 4/86* | (2006.01) |

(52) U.S. Cl.
CPC .... *H01M 4/926* (2013.01); *H01M 2004/8684* (2013.01); *H01M 2008/1095* (2013.01)

(58) Field of Classification Search
CPC ... B01J 23/40; B01J 23/42; B01J 23/44; B01J 21/18; B01J 23/46; H01M 4/926
USPC .......................................................... 502/185
See application file for complete search history.

(56) References Cited

U.S. PATENT DOCUMENTS

| | | | | |
|---|---|---|---|---|
| 9,437,877 | B2 * | 9/2016 | Rehman | H01M 4/925 |
| 9,844,762 | B2 * | 12/2017 | Worsley | B01J 13/0091 |
| 9,991,018 | B2 * | 6/2018 | Kim | C01B 32/174 |
| 10,014,532 | B2 * | 7/2018 | Arihara | C22C 5/04 |
| 10,135,074 | B2 * | 11/2018 | Takahashi | H01M 4/9083 |
| 10,399,053 | B2 * | 9/2019 | Worsley | C01B 32/168 |
| 10,446,852 | B2 * | 10/2019 | Li | H01M 4/926 |
| 10,847,811 | B2 * | 11/2020 | Arihara | H01M 4/8882 |
| 10,985,382 | B2 * | 4/2021 | Sugimoto | B01J 23/46 |

(Continued)

*Primary Examiner* — Cam N. Nguyen
(74) *Attorney, Agent, or Firm* — Idea Intellectual Limited; Margaret A. Burke; Sam T. Yip

(57) ABSTRACT

The present invention provides a method of fabricating a catalytic reaction material. A solution of a carbon precursor compound and a noble metal precursor compound is prepared; the carbon precursor compound includes a salt component. The solution is recrystallized the solution to form recrystallized complexes including both the carbon precursor compound and the noble metal precursor compound. The recrystallized complexes are calcined to create a salt template for generation of two-dimensional carbon nanosheets embedding isolated noble metal atoms. Further calcining and washing decomposes the salt template to produce two two-dimensional carbon nanosheets embedding isolated noble metal atoms, each nanosheet having a thickness of approximately 1 to approximately 10 nanometers.

10 Claims, 4 Drawing Sheets

(56) References Cited

U.S. PATENT DOCUMENTS

| | | | |
|---|---|---|---|
| 2009/0117257 A1* | 5/2009 | Monnier | H01M 4/92 427/113 |
| 2009/0202869 A1* | 8/2009 | Sawaki | C01B 32/05 427/215 |
| 2009/0220682 A1* | 9/2009 | Monnier | C23C 18/1651 427/113 |
| 2009/0246602 A1* | 10/2009 | Sawaki | H01M 4/9083 252/507 |
| 2012/0252662 A1* | 10/2012 | Assmann | B01J 21/185 977/773 |
| 2013/0264524 A1* | 10/2013 | Liu | C01B 32/168 977/932 |
| 2018/0345265 A1* | 12/2018 | Wang | B01J 23/20 |
| 2021/0025064 A1* | 1/2021 | Siddiqui | C25B 11/095 |
| 2021/0316289 A1* | 10/2021 | Ma | H01M 4/9008 |
| 2022/0042186 A1* | 2/2022 | Zhang | C25B 1/04 |

* cited by examiner

METHOD OF FABRICATING A MATERIAL FOR USE IN CATALYTIC REACTIONS

FIELD OF THE INVENTION

The present invention relates to proton exchange membrane fuel cell materials and, more particularly, to PEMFC materials with dispersed noble metal catalysts.

BACKGROUND

Proton exchange membrane fuel cells (PEMFCs) that utilize hydrogen and oxygen as reactants have attracted considerable attention as environmentally friendly energy conversion systems, as they can be operated at relatively low temperatures (<100° C.) and generate only clean water as the reaction product. Unfortunately, several technical barriers including high cost, limited lifetime and insufficient power density seriously hinder their widespread application. Currently, Pt or its alloys are used as the anode catalyst in PEMFC systems due to its good catalytic activity, resistance to corrosion, and ability to withstand the operating environment. Platinum works as a catalyst by collecting oxygen atoms and binding them to carbon monoxide reaction products to create carbon dioxide ($CO_2$).

Currently, all the hydrogen oxygen reduction (HOR) catalysts used for PEMFCs are based on Pt nanoparticles dispersed on a carbon substrate, e.g., 20% Pt/C. Even though the HOR performance of commercial Pt/C satisfies the needs of PEMFCs, it is desirable to further reduce the Pt usage through exposing more active yet stable Pt catalytic sites, which can decrease the PEMFC's price. Moreover, the current commercial Pt/C are fabricated by complex methods and at very high cost. Although Pt usage can be minimized by an even dispersion of isolated Pt atoms, no atomically dispersed Pt catalysts that are embedded in a conductive carbon matrix that can promote hydrogen oxidation at a rate high enough for practical fuel cell applications have been reported to date. Therefore, there is a need in the art for an effective method for isolating Pt atoms in carbon nanosheets to significantly increase the atom usage to nearly 100%.

SUMMARY OF THE INVENTION

The present invention provides a coordination-carbonization-washing method for bottom-up fabricating isolated noble metal atoms, such as Pt, dispersed on carbon nanosheets. Carbon nanosheets with atomically dispersed Pt atoms (Pt content<1.0 wt %) enable a superior electrocatalytic HOR performance including both activity and durability comparable to commercial carbon-supported 20 wt % Pt catalysts. Notably, the mass activity of Pt in the isolated Pt atoms dispersed on carbon nanosheets can exceed more than 10 times the activity of the commercial 20 wt % Pt/C catalysts. Considering the ultrahigh catalytic activity and ultralow production cost, the reported isolated Pt atoms dispersed on carbon nanosheets can serve as the candidate anode catalysts in the next-generation PEMFCs.

In addition, the method of present invention may be applicable not only to Pt atom, but also other noble metal atoms such as Rh, Ru, Pd and Ir. As such, diverse catalysts, which may be suitable for different applications, may be fabricated by the present method.

In one aspect, the present invention provides a method of fabricating a catalytic reaction material. A solution of a carbon precursor compound and a noble metal precursor compound is prepared; the carbon precursor compound includes a salt component. With the help of citrate sodium with strong chelating ability, the solution is recrystallized the solution to form recrystallized complexes including both the carbon precursor compound and the noble metal precursor compound. The recrystallized complexes are calcined to create a salt template for generation of two-dimensional carbon nanosheets embedding isolated noble metal atoms. Further calcining and washing decomposes the salt template to produce two two-dimensional carbon nanosheets embedding isolated noble metal atoms, each nanosheet having a thickness of approximately 1 to approximately 10 nanometers.

The invention also includes two-dimensional carbon nanosheet embedding isolated noble metal atoms and proton exchange membrane fuel cell anodes made from the two-dimensional carbon nanosheet embedding isolated noble metal atoms.

DETAILED DESCRIPTION

Figure 1:
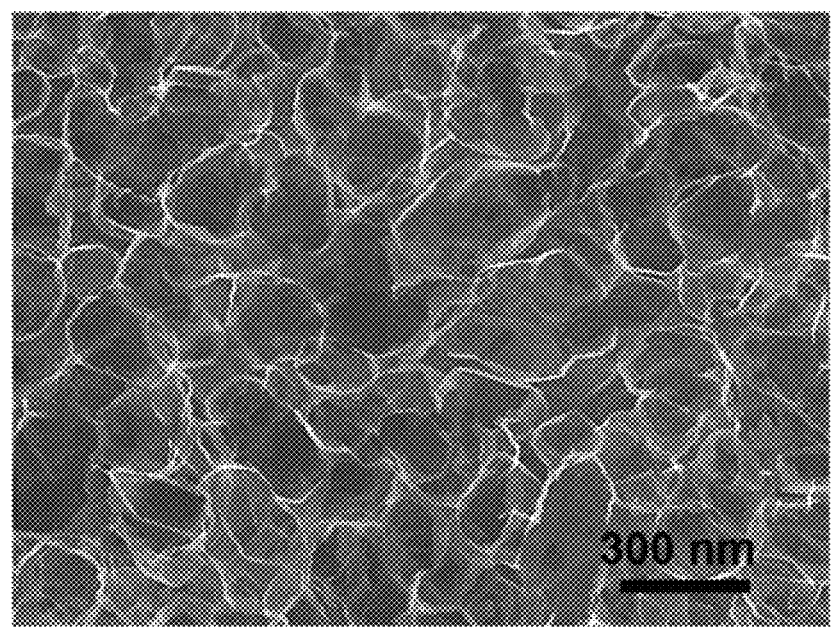
FIG. 1 depicts an SEM image of isolated platinum atoms on a carbon nanosheet prepared according to the method of the present invention.

The method of present invention creates stable single-atom sites to promote the usage efficiency of precious metals to nearly 100% for relevant catalytic applications, such as hydrogen oxidation reaction (HOR) and hydrogen evolution reaction (HER) for hydrogen fuel cells. Exemplary noble metals include platinum, palladium, iridium, ruthenium, and rhodium. A convenient coordination-carbonization-washing method may be applied to the large-scale fabrication of carbon nanosheets with isolated noble metal atoms, which can serve as efficient HOR catalysts for proton exchange membrane fuel cells with both superior mass activity and high stability. The carbon nanosheet-supported isolated noble metal atoms show remarkable HOR properties with high mass activity and stability (the mass activity can exceed more than 10 time than the commercial 20 wt % Pt/C catalysts).

In the method of fabricating a catalytic reaction material, a precursor solution is formed. The precursor solution includes a carbon precursor compound and a noble metal precursor compound in an aqueous solution, with solvent materials including only water. In one aspect, the carbon precursor compound includes a salt component. An exemplary carbon precursor compound is selected from a sodium based precursor compound such as trisodium citrate. Other suitable carbon precursor compounds include gluconic acid sodium salt and ethylenediaminetetraacetic acid disodium salt.

The solution is recrystallized by evaporating excess water to form recrystallized complexes including the carbon precursor compound and the noble metal precursor compound.

In this manner, the noble metal is evenly distributed among the carbon precursor, allowing small amounts of noble metals to be used on an atomic level.

In one aspect, the carbon precursor compound creates a salt template for generation of two-dimensional carbon nanosheets embedding the isolated noble metal atoms. This salt template is calcined to decompose the salt template, followed by washing, to produce two two-dimensional carbon nanosheets embedding isolated noble metal atoms, each nanosheet having a thickness of approximately 1 to approximately 10 nanometers.

The noble metal may be one or more of platinum, iridium, palladium, ruthenium, or rhodium and may be used in the form of a noble metal salt. Exemplary noble metal salts include $K_2PtCl_6$, $IrCl_3$, $PdCl_2$, $RuCl_3$, or $RhCl_3$. To reduce the overall quantity of the noble metal used in the carbon nanosheets, the weight ratio of the noble metal precursor compound to the carbon precursor compound ranges from approximately 1:300 to 1:500. Such a weight ratio is sufficient to produce carbon nanosheets having a noble metal weight content of about 0.1 to 1.0 wt % of the total weight of the carbon nanosheets.

The calcining process may be performed at a temperature of approximately 550 to 800° C. with a heating rate of about 2 to 50° C./min.

The as-formed carbon nanosheets may be further treated, e.g., thermal treatment or chemical modification, to regulate the coordination environment of atomic noble metal atoms to enhance the catalytic applications.

A two-dimensional carbon nanosheet embedding isolated platinum metal atoms is depicted in the SEM image of FIG. 1. A proton exchange membrane fuel cell anode can incorporate the two-dimensional carbon nanosheet embedding isolated platinum metal atoms of FIG. 1.

Example

A. Carbon Nanosheet Fabrication

Trisodium citrate and $K_2PtCl_6$ with a certain percentage (mass ratio: 200~2000) were first dissolved in pure water and subsequently recrystallized and ground at a certain temperature (60~100° C.) to obtain well-coordination mixture; the second step involves high-temperature calcination (600~800° C.) in inert atmosphere and subsequent repeated washing using large-amount pure water. During the calcination process, the in-situ generated $Na_2CO_3$ nanoparticles can serve a unique salt template for the generation of two-dimensional carbon nanosheets. As a result, isolated Pt atoms on carbon nanosheets with extremely high atomic utilization for hydrogen oxidation reaction for PEMFCs are achieved.

Figure 2:
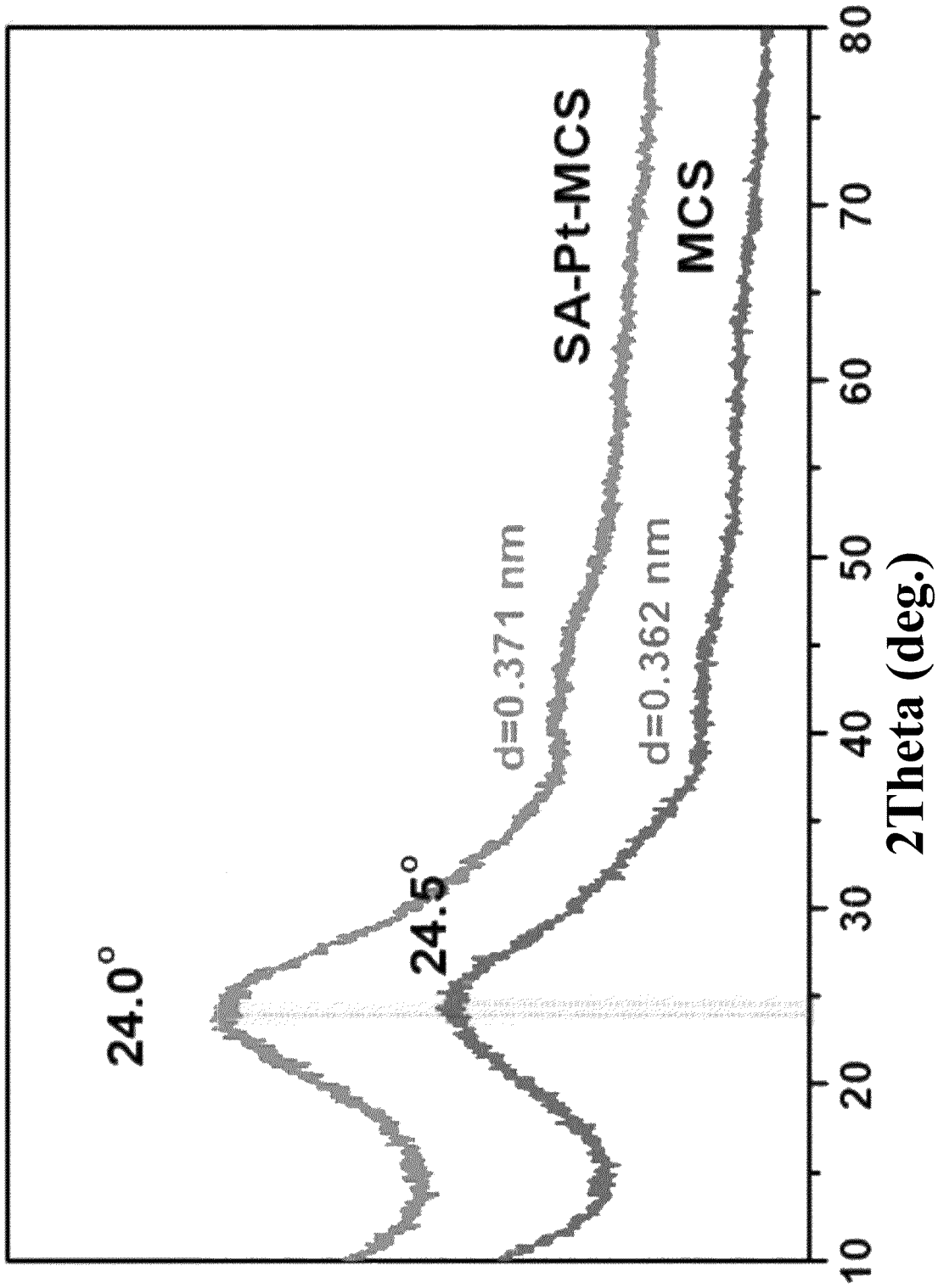
FIG. 2 presents an x-ray diffraction pattern of isolated platinum atoms on a carbon nanosheet prepared according to the method of the present invention.

The produced carbon nanosheet with platinum atoms is shown in FIG. 1. An x-ray diffraction pattern for the material is shown in FIG. 2, comparing the inventive material to Pt containing nanocrystals. The x-ray diffraction pattern shows no detected diffraction peaks assigned to Pt crystal, suggesting the ultra-small size of Pt in carbon nanosheets.

B. Carbon Nanosheet Testing

Figure 3:
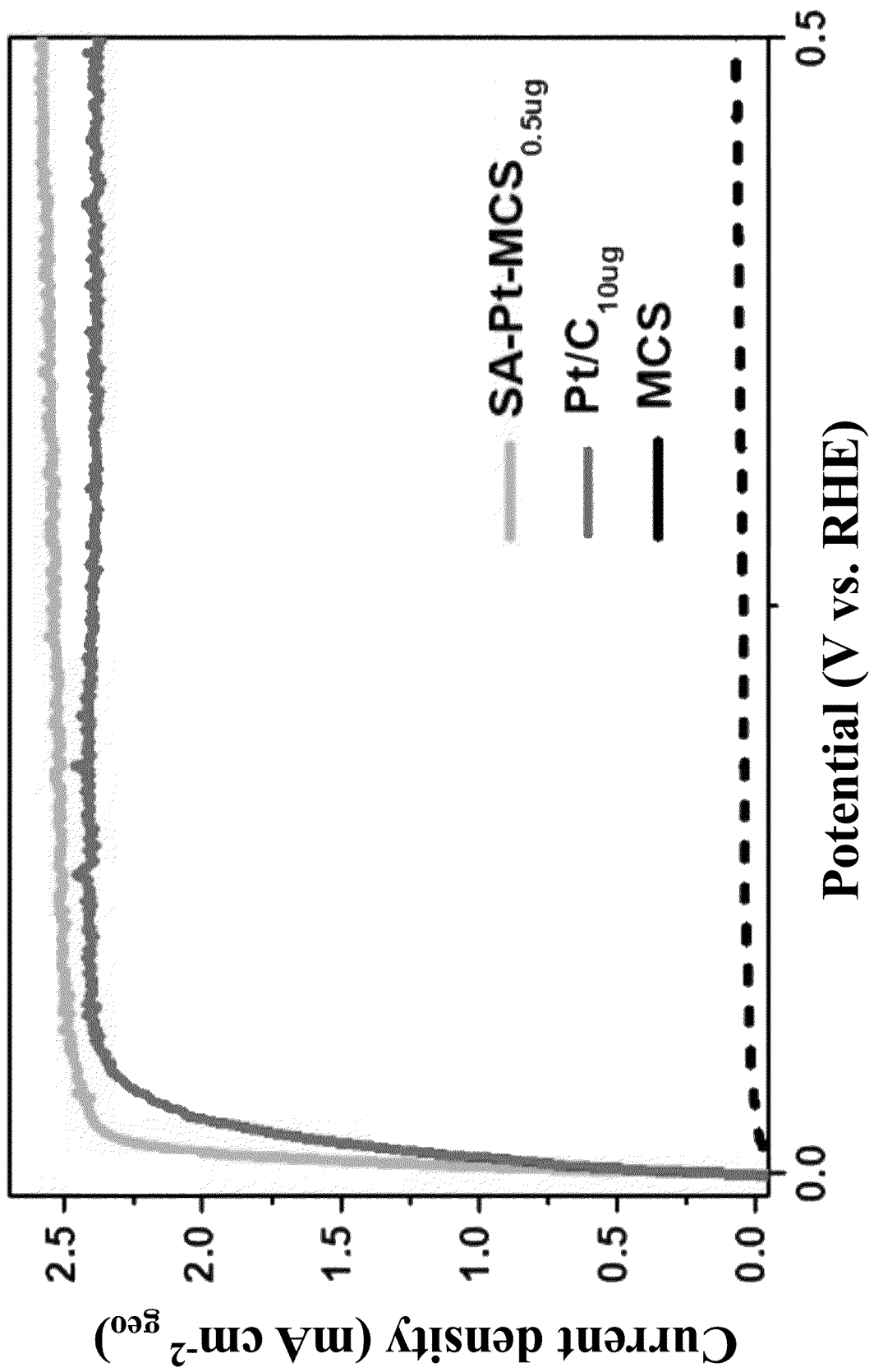
FIG. 3 presents hydrogen oxidation reaction (HOR) activity of isolated platinum atoms on a carbon nanosheet prepared according to the method of the present invention. The catalytic performance is evaluated in 0.1M HClO4.
Figure 4:
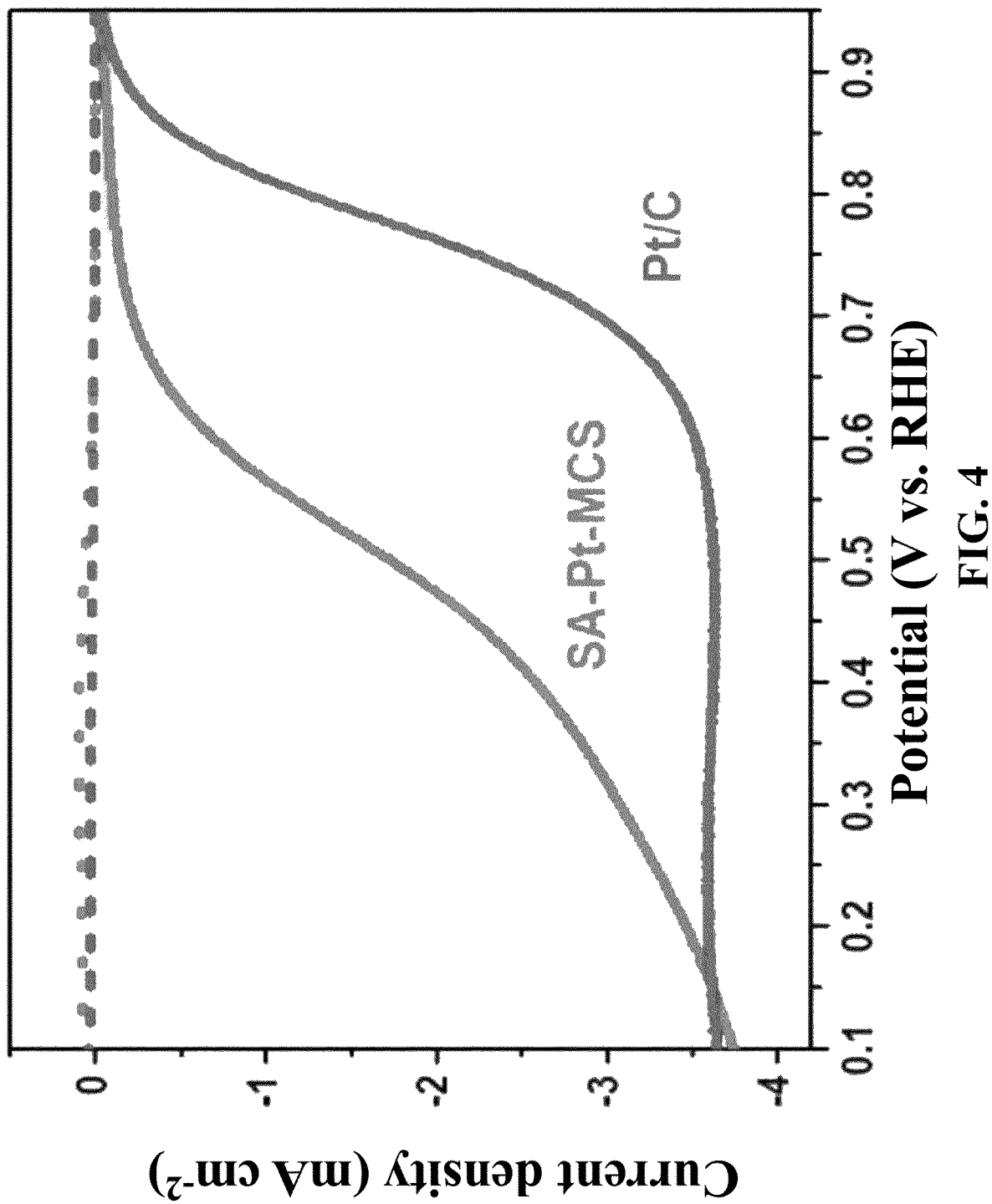
FIG. 4 shows oxygen reduction reaction (ORR) activity of isolated platinum atoms on a carbon nanosheet prepared according to the method of the present invention. The catalytic performance is evaluated in 0.1M HClO4.

All the electrochemical testing was based on a three-electrode system, in which a glassy carbon coated with active catalysts was served as working electrode. The carbon nanosheets with platinum atoms of FIG. 1 were tested for catalytic activity and the results are depicted in FIG. 3 for the hydrogen oxidation reaction (HOR) activity of using hydrogen saturated 0.1M HClO4. FIG. 4 shows the oxygen reduction reaction (ORR) activity of isolated platinum atoms on a carbon nanosheet prepared according to the method of the present invention. The catalytic performance is evaluated in oxygen saturated 0.1M HClO4.

As seen in FIGS. 3 and 4, the atomically-dispersed Pt in carbon nanosheet exhibits a superior electrocatalytic hydrogen oxidation reaction (HOR) performance including both activity and durability comparable to commercial carbon-supported 20 wt % Pt catalysts (FIG. 3). More importantly, the relevant catalysts deliver suppressed oxygen reduction reaction (ORR) performance (FIG. 4), which can protect the cathode from serious corrosion caused by the repetitive startup and shut-down events in practical PEMFCs.

INDUSTRIAL APPLICABILITY

The present invention provides a convenient and economical approach for fabricating carbon nanosheets having isolated noble metal atoms embedded therein. With the use of the present coordination-carbonization-washing approach, the carbon nanosheets with isolated Pt may be easily obtained having an ultralow Pt content (<1 wt. %), which is superior to previous Pt nanoparticles-supported carbon substrate. The present invention also possesses the following advantages:

Simple experimental setup and simple fabrication processes without expensive equipment such as vacuum, clean room, or sophisticated control systems which are generally required by other chemical technologies for fabricating ultra-small Pt nanoparticles and subsequently mixing with a conductive carbon substrate.

Compatible with convenient large-area fabrication with high uniformity that can be readily mass produced on an industrial scale.

The product price of Pt atoms dispersed carbon nanosheets is very low. For example, the cost price for 0.2 wt % Pt-based carbon nanosheets can be controlled to the less than 1 USD per gram.

A wide range of noble metal atoms (including Pt, Ru, Ir, Rh and Pd)-dispersed carbon nanosheets can be fabricated.

It should be apparent to those skilled in the art that many modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A method of fabricating a catalytic reaction material, comprising:
    forming a solution of a carbon precursor compound and a noble metal precursor compound, the carbon precursor compound including a salt component wherein wherein the weight ratio of the noble metal precursor compound to the carbon precursor compound ranges from approximately 1:300 to 1:500;
    recrystallizing the solution to form recrystallized complexes including the carbon precursor compound and the noble metal precursor compound;

calcining the recrystallized complexes to create a salt template for generation of two-dimensional carbon nanosheets embedding isolated noble metal atoms;

further calcining and washing to decompose the salt template to produce two two-dimensional carbon nanosheets embedding isolated noble metal atoms wherein wherein the isolated noble metal atoms have a weight content of about 0.1 to 1.0 wt % of the total weight of the carbon nanosheets, each nanosheet having a thickness of approximately 1 to approximately 10 nanometers.

2. The method of claim 1, wherein noble metal is at least one selected from the group consisting of platinum, iridium, palladium, ruthenium, and rhodium.

3. The method of claim 1, wherein the noble metal precursor compound is a noble metal salt.

4. The method of claim 3, wherein the noble metal salt is at least one selected from the group consisting of $K_2PtCl_6$, $IrCl_3$, $PdCl_2$, $RuCl_3$, and $RhCl_3$.

5. The method of claim 1, wherein the carbon precursor compound is a carbon-containing sodium salt.

6. The method of claim 5, wherein the sodium salt is trisodium citrate.

7. The method of claim 1, wherein calcination is performed at a temperature of approximately 550 to 800° C.

8. The method of claim 7, wherein the calcination occurs at a heating rate of about 2 to 50° C./min.

9. A two-dimensional carbon nanosheet embedding isolated noble metal atoms prepared by the method of claim 1.

10. A proton exchange membrane fuel cell anode prepared from the two-dimensional carbon nanosheet embedding isolated noble metal atoms of claim 9.

* * * * *